(12) United States Patent
Chang

(10) Patent No.: US 6,318,882 B1
(45) Date of Patent: Nov. 20, 2001

(54) FORMATIVE LAMP WITH THE EDGE-LIGHTING

(76) Inventor: Chih-Chen Chang, No. 32, Kuang South Street, Hsinchu City (TW)

( * ) Notice: Subject to any disclaimer, the term of this patent is extended or adjusted under 35 U.S.C. 154(b) by 0 days.

(21) Appl. No.: 09/637,604

(22) Filed: Aug. 15, 2000

(51) Int. Cl.[7] .................................................. F21S 10/00
(52) U.S. Cl. ......................... 362/252; 362/806; 362/235
(58) Field of Search ................................. 362/252, 249, 362/31, 311, 186, 124, 234, 240, 363, 806, 807, 808

(56) References Cited

U.S. PATENT DOCUMENTS 5,577,831 * 11/1996 Chang ................................. 362/240
5,749,646 * 5/1998 Brittell ................................. 362/231

FOREIGN PATENT DOCUMENTS

360054147A * 3/1985 (JP) .

* cited by examiner

Primary Examiner—Alan Cariaso
Assistant Examiner—Hargobind S. Sawhney
(74) Attorney, Agent, or Firm—Rosenberg Klein & Lee

(57) ABSTRACT

The present invention provides a formative lamp with edge-lighting, which is consisted of two formative shells and the sandwich lighting plate. Wherein the formative shells are molded into the desired pattern and outline, and the lighting plate is made of high transmissivity material, and molded into the pattern outline as same as the shell's. In combination, the string lamps and the cords can be pre-inserted on the lighting plate, finally cover the formative shells from the both sides. When cut-in the power, the lamps inserted on the lighting plate is lighten, the light ray not only shine through the formative shells, but also via the high transparency lighting plate to generate an edge-lighting source along with the edge of the formative pattern. Hence, due to the brightness difference of the formative shells and the edge-lighting source of the lighting plate, the outline of the formative lamp is drawn out to increase the funny of the product.

4 Claims, 4 Drawing Sheets

FORMATIVE LAMP WITH THE EDGE-LIGHTING

BACKGROUND OF THE INVENTION

1. Field of the Invention

The present invention relates to a festival formative lamp, and more particularly to a formative lamp with the edge-lighting.

2. Description of Prior Art

In accordance with the conventional festival fancy lamps, most of them are constructed of twining a string lamp on a formative frame. But due to exposing the cords to the air, the whole formative art is affected a bit. So there is another kind of fancy lamp came out later, which is composed of two half of formative frame shells containing the entire string lamp and cords inside, so that the cords are not exposed to the air and the lamps are hidden into the shell.

But there are some shortcomings existing in the above-mentioned formative frame shell lamp as follows:

1. Because the light source is applied of the similarities of the conventional Christmas string lamp, and the light source is not treated in mean scatter, the lamp is looked to as a collected many spot lights in a longer distance, so that the outline of the formative lamp configured by the light of inside string lamp is so soft that the formative outline can not be presented.

2. Due to considering to the transparency of the shell of the formative lamp, the thickness of the shell is moulded into very thin so that the joint portion of the shell and the retainer is easy to be damaged by an extra force as plug the lamp socket of the lamp into the retainer of the shell.

3. Because the lamp is direct installed into inside of the shells, when plug the lamp socket into the thin portion of the pattern of formative lamp, the installation process becomes difficult due to the limited presetting space, it will affect the assembly operating efficiency directly.

OBJECTS AND SUMMARY OF THE INVENTION

It is therefore a main object of the present invention to provide a formative lamp that has a brightening outline along the pattern of it.

It is another object of the present invention to a formative lamp with an improved structure, which is easy to be manufactured and assembled, meanwhile the production cost will be decreased.

These objects are achieved by a formative lamp, which is consisted of two half of formative shells and a sandwich lighting plate. Wherein the formative shells are moulded into the desired pattern and outline, and the lighting plate is made of high transmissivity material, and moulded into the pattern outline as same as the shell's. In combination, the string lamps and the cords can be pre-inserted on the lighting plate, finally cover the formative shells from the both sides.

When cut-in the power, the lamps inserted on the lighting plate is lighten, the light ray not only shine through the formative shells, but also via the high transparency lighting plate to generate an edge-lighting source along with the edge of the formative pattern. Hence, due to the brightness difference of the formative shells and the edge-lighting source of the lighting plate, the outline of the formative lamp is drawn out to increase the funny of the product.

When increase the thickness of the lighting plate, it will reinforce the joint portion of the retainer on the lighting plate. And because the lamp sockets are installed on the lighting plate, so the force of plugging the lamp socket cannot damage the formative shells. And due to the lighting plate is flat, plugging the lamp sockets is became easy and convenient.

DETAILED DESCRIPTION OF PREFERRED EMBODIMENTS

Figure 1:
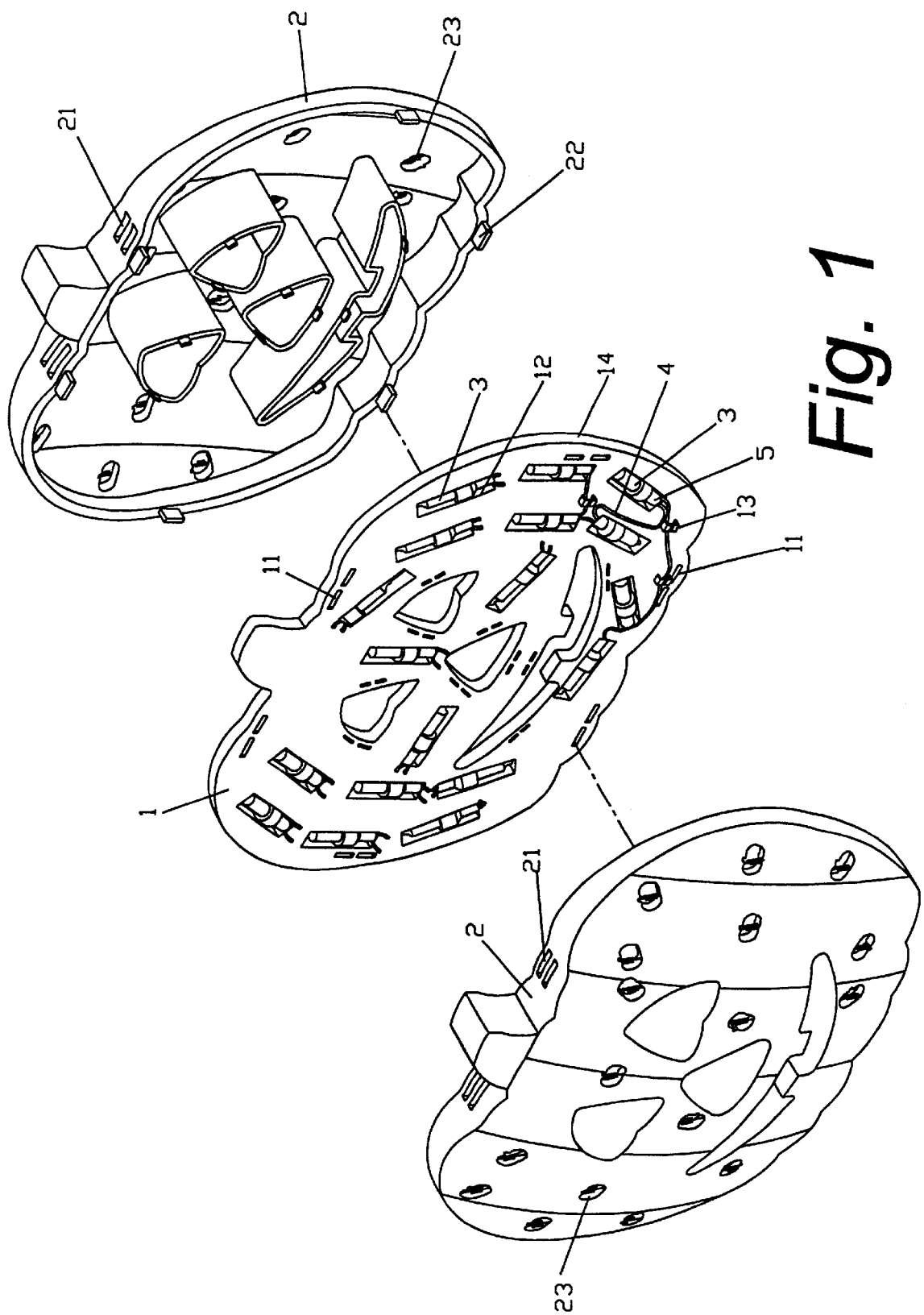
FIG. 1 is a solid view showing the exploded state of the first operation of the present invention.
Figure 3:
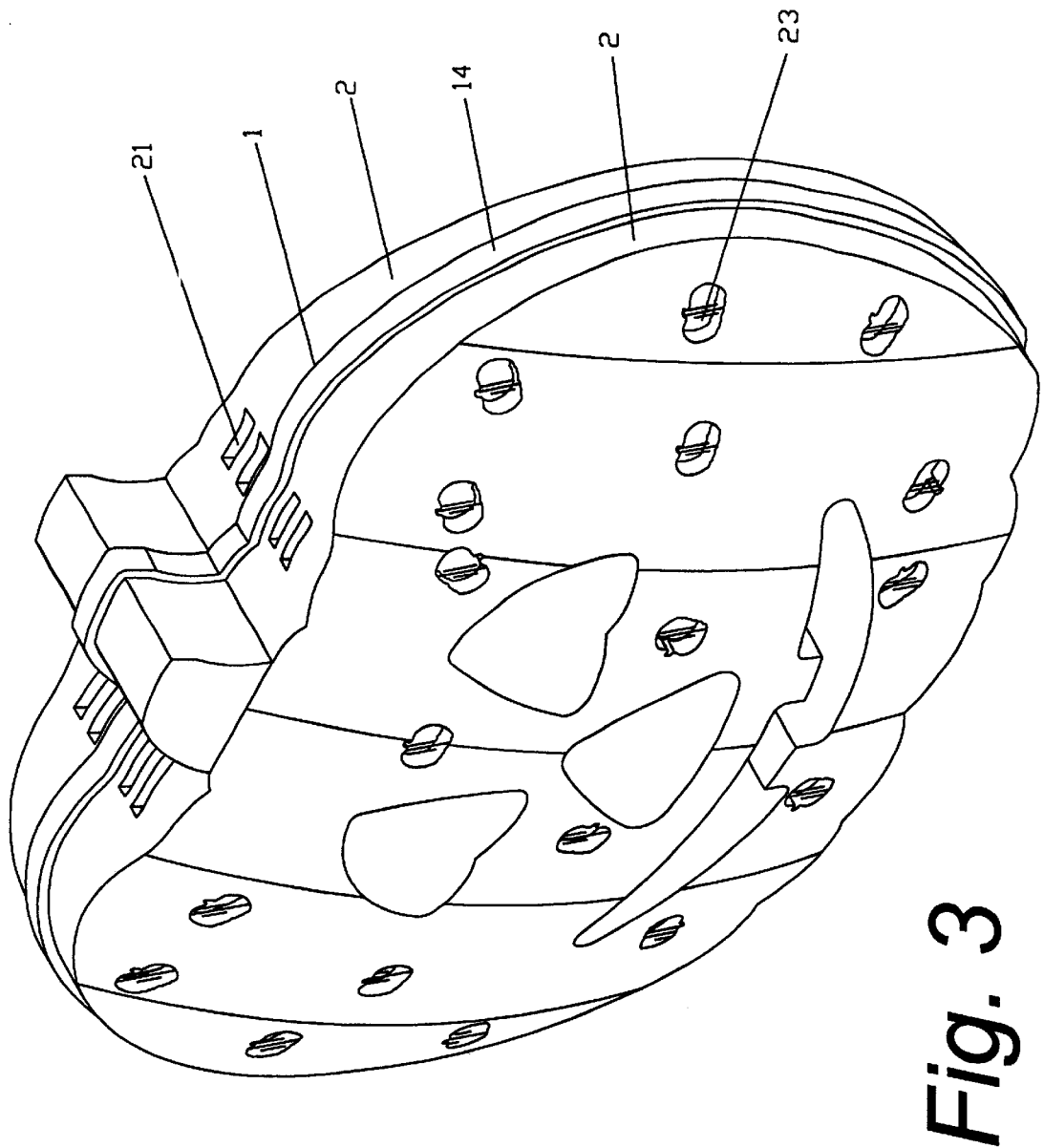
FIG. 3 is a solid view showing the exterior of the first operation and the second operation of the present invention.
Figure 4:
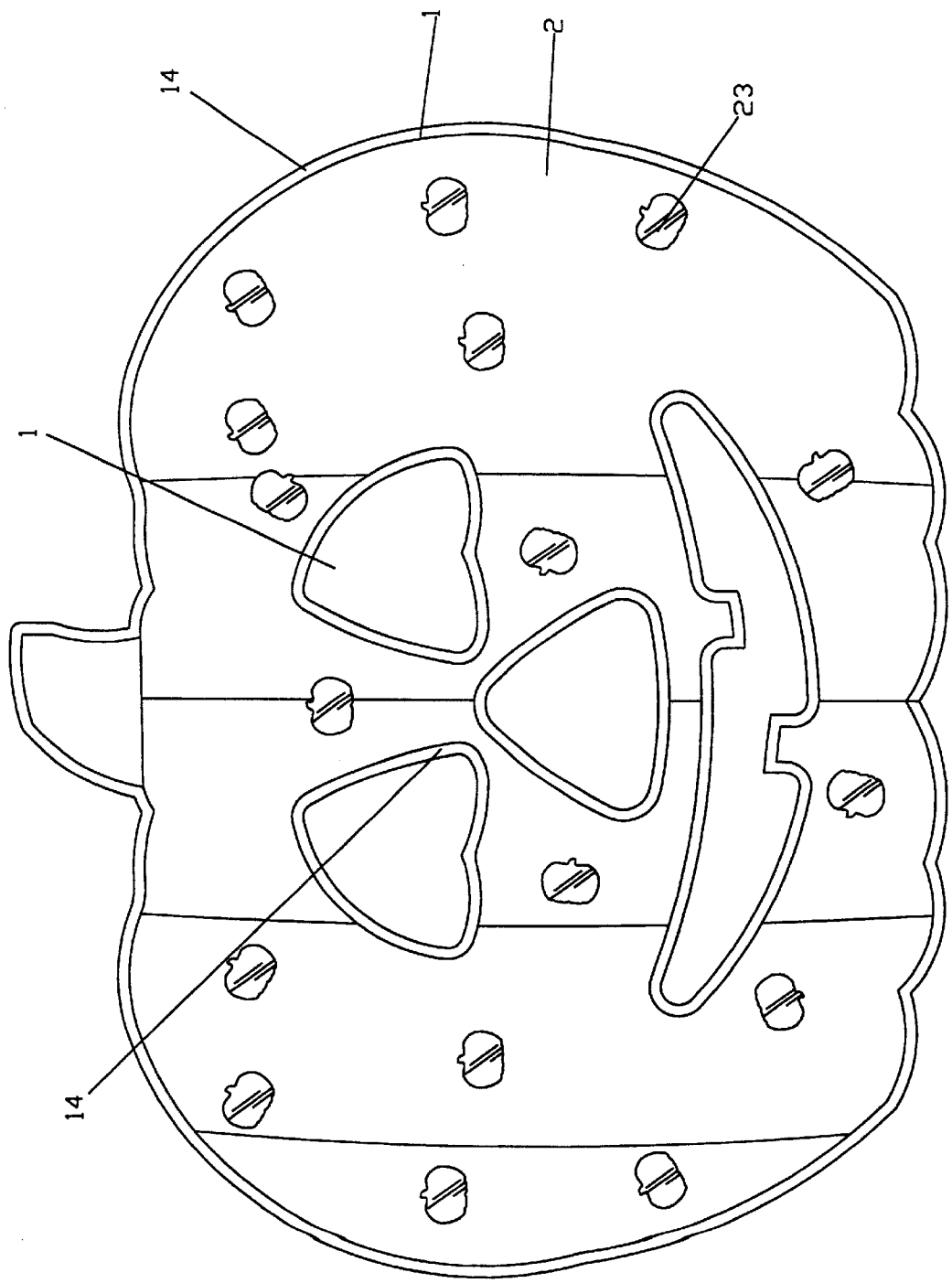
FIG. 4 is front side view showing the first operation and the second operation of the present invention.

Referring to FIG. 1, FIG. 3 and FIG. 4, the first operation of the present invention provides a formative lamp, which is consisted of two formative shells 2 and the sandwich lighting plate 1. Wherein the formative shells 2 are moulded into the desired pattern and outline, and there are a proper number of cooling holes 21 and retainer units 22 formed along the side flange. The lighting plate 1 is made of high transmissivity material, and co-ordinating to the outline of the pattern of the formative shells 2, the lighting plate 1 is moulded into a outline of the outer rim as same as or a bit bigger than the formative shells 2's at least. And to the inner hole-rim (for example as eyes, noise, and eyes), the outline should be as same as or smaller a bit than the formative shells 2's. There are several retainer holes 12 for holding the lamp-socket in and cord dampers 13 formed on the lighting plate 1. And along the edge of the outline, there are several locking portion 11 formed coordinating is to the retainer units 22 of the formative shells 2.

In combination, the sockets 5 of the string lamp are inserted into the retainer holes 12 of the lighting plate 1 first; meanwhile the cords 4 are fixed in the dampers 13. Finally, by locking the retainer units 22 of the formative shells 2 into the locking portion 11 of the lighting plate 1, the two formative shells 2 are covered on the lighting plate 1 from the both sides, and the rim of the lighting plate 1 is extended out from the edges of the formative shells 2.

When cut-in the power, the lamps 3 on the lighting plate 1 are lighten, the light ray not only shine through the formative shells 2, but also via the high transparency lighting plate 1 to generate an edge-lighting source along with the edge of the formative pattern. Hence, whatever as same as or bigger or smaller than the outline of the formative shells 2, the lighting plate 1 will generate an edge-lighting source to create the brightness difference of the formative shells 2, so that the outline of the formative lamp is drawn out.

For decreasing the production cost and weight, the lighting plate 1 can be moulded into pierced.

Figure 2:
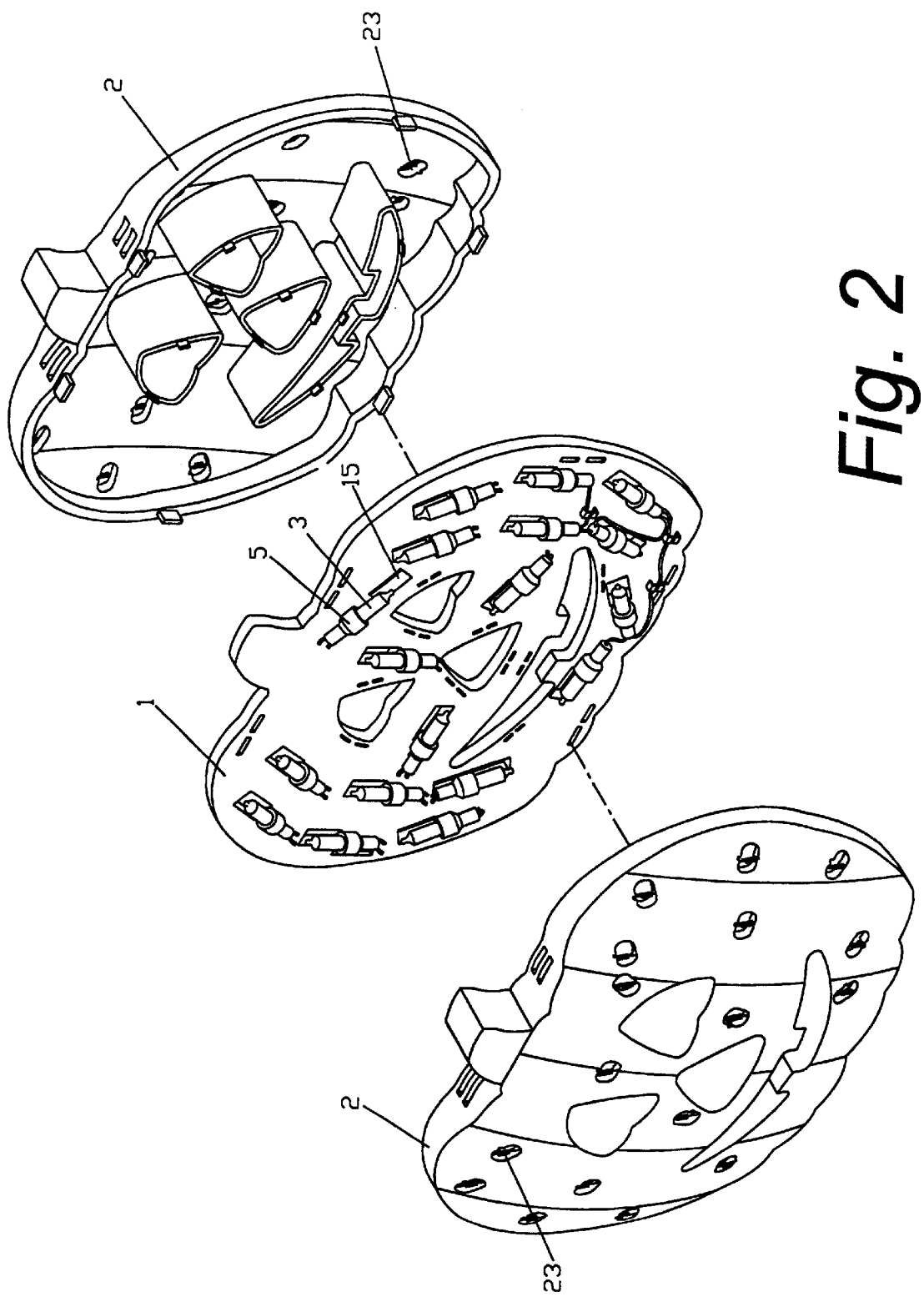
FIG. 2 is a solid view showing the exploded state of the second operation of the present invention.

Referring to FIG. 2, the second operation of the present invention provides a formative lamp, which is consisted of two formative shells 2 and the sandwich lighting plate 1. Wherein the difference with the first operation is the lamp-sockets 5 attached on the one side of the lighting plate 1. The rests are as same as the first operation. So it's unnecessary to describe again in here.

On the lighting plate 1, co-ordinating to the bulbs 3, a through loop-hole 15 is drilled so that the light ray can shine through the other side formative shell 2 more directly, hence the brightening difference of the both formative shells 2 is decreased.

Referring to FIG. 1, FIG. 2 and FIG. 3, for increasing the funny of the product, the formative shells 2 of the present invention may have several thin, portions as the transmission windows 23 on the outside surface to generate more than two kinds of different brightness. If the formative shells are made of higher transmission material, the surface can be printed with colours and keeping the transmissivity of the formative shells 2, the light ray of the bulbs 3 gives out from the inside of the formative shells to build an other surrounding feeling.

I claim:

1. A formative lamp with edge-lighting comprising two formative shells sandwiching a lighting plate; the lighting plate mounting bulb-sockets therein is made of high transmissivity material for radiating light to a rim portion of the lighting plate, the peripheral contour of the lighting plate having a contour substantially matching the formative shells, the formative shells having light transmissive windows formed therethrough.

2. A formative lamp with edge-lighting as claimed in claim 1, wherein the lighting plate has retainer holes for holding the lamp-socket in.

3. A formative lamp with edge-lighting as claimed in claim 1, wherein on the lighting plate, co-ordinating to each bulb, a through loophole is drilled.

4. A formative lamp with edge-lighting as claimed in claim 1, wherein the formative shells have several thin portions as the transmission windows on the outside surface.

* * * * *